(No Model.)
A. NETHERWOOD.
TENSION REGULATING DEVICE FOR SPINDLE DRIVING BANDS.
No. 409,799. Patented Aug. 27, 1889.
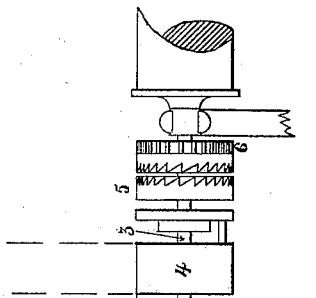
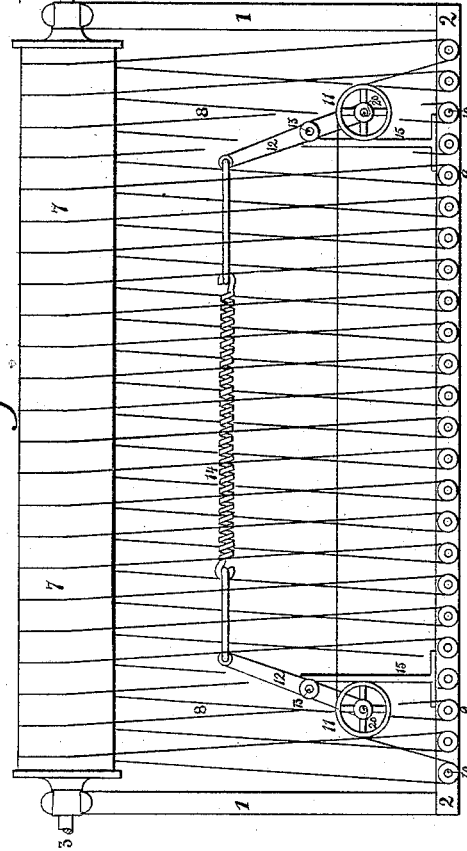
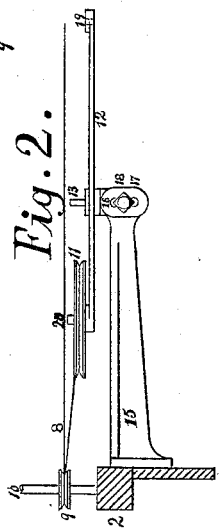
Fig. 1.
Fig. 2.
Witnesses.
Chas. D. Helm
John W. Lee
Inventor.
Abraham Netherwood

United States Patent Office.

ABRAHAM NETHERWOOD, OF NEW BRUNSWICK, NEW JERSEY.

TENSION-REGULATING DEVICE FOR SPINDLE-DRIVING BANDS.

SPECIFICATION forming part of Letters Patent No. 409,799, dated August 27, 1889.

Application filed March 26, 1889. Serial No. 304,844. (No model.)

*To all whom it may concern:*

Be it known that I, ABRAHAM NETHERWOOD, a citizen of the United States, residing at New Brunswick, county of Middlesex, and State of New Jersey, have invented a new and useful Improvement in Tension-Regulating Devices for Spindle-Driving Bands, of which the following is a full, clear, and exact description.

My invention relates to spinning-machines, and has for its object to improve the tension-regulating devices to be used in connection with the endless bands of a spinning-machine which drive all or nearly all of the spindles thereof; and the invention consists in the simple and peculiar construction and arrangement of the said tension-regulating device in combination with said endless bands. The mechanism by which I obtain this is shown in the accompanying drawings, in which—

Figure 1 is a plan view of a portion of a spinning-machine having applied thereto my improved mechanism, and also shows the driving arrangement of the spinning-machine. Fig. 2 is a detail side view of the lever with an idler-pulley by which I obtain (with a spring) the tension, and is hereinafter fully described.

In the drawings, Fig. 1, 1 represents portions of the frame of a spinning-machine, and 2 the bolster-rail thereof. 3 is the driving-shaft, having suitable bearings on frame 1. 4 is a pulley to drive said shaft, and upon said shaft is a ratchet-clutch 5 and cog-wheel 6, for reversing the rotation of the spindles of the spinning-machine. The drum 7 is fastened upon the driving-shaft 3 for driving the spindles, for the reason that the spindle-bands run with more uniformity over a drum than over separate pulleys.

Instead of using separate bands for each spindle, I use an endless band 8, made of any suitable material.

The driving-shaft 3 is driven by a suitable pulley 4. Upon said shaft 3 the drum is fastened to this shaft, and the endless band 8 is put around drum 7 for driving the spindles 10 by passing alternately around drum and whirls 9 9 and around idler-pulleys 11 11 upon levers 12 12. Said levers 12 are centered on pins or studs 13 13, which are fastened upon movable heads onto stands 15 15, as hereinafter more fully described.

Connecting with levers 12 12 at 19 19 is a spring 14, which operates upon the levers 12 12 and exerts a constant tension, and thereby gives a greater uniformity to the rotation of the spindles by taking up the slack occasioned by the stretching of the band, maintaining substantially an unvarying tension between the driving-shaft and spindle-whirls. The said levers and idler-pulleys, with stand 15 and upright 16, are shown more in detail in Fig. 2.

The stand 15 can be bolted on the spinning-frame or bolster-rail, and between it and the driving-shaft 3 or drum 7, and also between the bands. By placing it in this position a great deal of room is saved.

Upon the side of stand 15 is the upright 16, with slot 17, through which a bolt 18 passes, and in the top of the upright 16 is a stud 13, upon which lever 12 is pivoted; and by means of this upright 16, with slot 17, the lever 12, with idler-pulley 11, can be raised or lowered to suit the height of the bands.

The spring 14 is fastened at 19 to the lever 12, with idler-pulley 11 upon the other end on stud 20, and the lever is swung by spring 14 upon upright stud 13.

The essential advantage of my improved tension-regulating device for spindle-driving bands consists in the fact that by the spring 14 pulling or tightening upon the levers 12 12 upon studs 13 13 the idler-pulleys 11 11 are made to work with a uniform tension very accurately and delicately upon the endless bands 8.

Another advantage in the use of my improvement is, that it is simple and is easily kept in order, that it only occupies waste room, and that in the use of two idlers on levers connected by spring there can be twice the number of spindles driven by a single band than by the use of one idler.

My invention, although especially intended for use in connection with spinning-machines, is, it is evident, applicable to any device where a uniform tension is required.

Having described my improved mechanism, I claim and desire to secure by Letters Patent of the United States—

The combination, with the drum 7, the spindles 10, having whirls 9, and the endless band 8, of the stands 15, the studs 13, means to adjust said studs vertically on said stands, the levers 12, pivoted on said studs and provided with the eyes 19 and the pins 20, the idler-wheels 11 on said pins, and the spring 14, substantially as shown and described.

In testimony whereof I have signed my name to this specification in the presence of two subscribing witnesses.

ABRAHAM NETHERWOOD.

Witnesses:
   CHAS. D. HELM,
   JOHN W. LEE.